H. A. DENMIRE.
PIPE OR HOSE COUPLING.
APPLICATION FILED FEB. 25, 1920.
1,375,136. Patented Apr. 19, 1921.
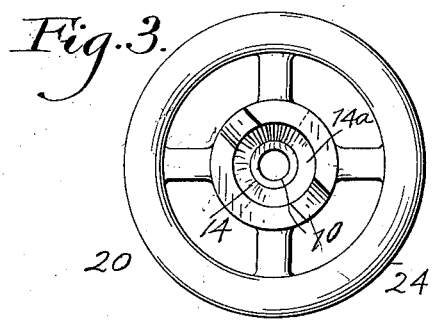
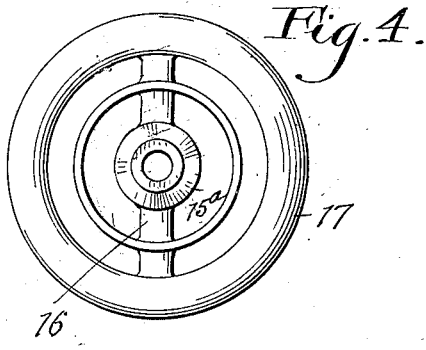
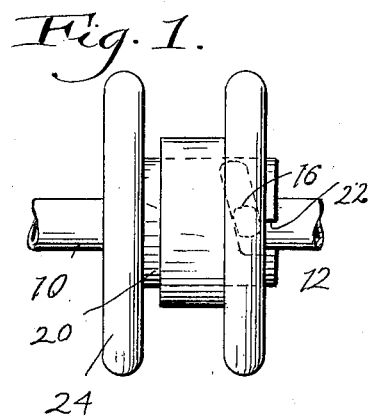
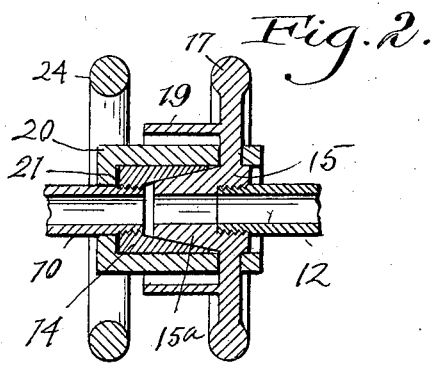
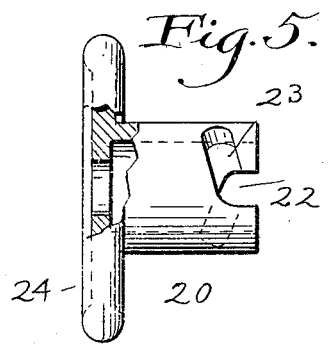
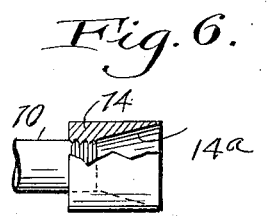
Inventor.
Harold A Denmire
by
Thurston Kwis & Hudson

UNITED STATES PATENT OFFICE.

HAROLD A. DENMIRE, OF AKRON, OHIO, ASSIGNOR TO THE GENERAL TIRE & RUBBER COMPANY, OF AKRON, OHIO, A CORPORATION OF OHIO.

PIPE OR HOSE COUPLING.

1,375,136. Specification of Letters Patent. Patented Apr. 19, 1921.

Application filed February 25, 1920. Serial No. 361,163.

*To all whom it may concern:*

Be it known that I, HAROLD A. DENMIRE, a citizen of the United States, residing at Akron, in the county of Summit and State of Ohio, have invented a certain new and useful Improvement in Pipe or Hose Couplings, of which the following is a full, clear, and exact description.

The object of this invention is to enable one to quickly couple together two alined pipes so as to make a tight joint between them. In the form in which the invention is shown it is especially designed for use to connect a fluid pressure supply pipe with the valve stem of an air bag in a tire casing which is in the mold cavity of a mold preparatory to vulcanizing said tire casing. It is to be understood, however, that the invention is not limited to this particular use.

In the drawing, Figure 1 is a side elevation of my improved coupling; Fig. 2 is a longitudinal sectional view thereof, Fig. 3 is an end view of the coupling sleeve 20 from the right end thereof as shown in Fig. 1; Fig. 4 is an end view of the cone coupling member as viewed from the left end thereof, as shown in Fig. 1; Fig. 5 is a side elevation of said coupling sleeve 20, and Fig. 6 is a side elevation partly sectioned of the coupling member which has the conical recess.

Referring to the parts by reference characters, 10 and 12 represent the two pipes which are to be coupled together. The pipe 10 may be the valve stem of an air bag, and the pipe 12 may be a pipe through which pressure fluid is discharged into said valve stem and thence into the air bag for purposes well understood.

A coupling member 14 is screwed onto the end of the pipe 10, and it has in its end a conical recess 14ª. The coöperating coupling member 15 is screwed onto the end of the pipe 12 and it is formed with a conical end 15ª which is fitted to the recess 14ª and enters and tightly fits the same when the two pipes are coupled together.

A coupling sleeve 20 loosely embraces the pipe 10 behind the coupling member 14 which it also embraces loosely, and it has a shoulder 21 for engagement with the end of the coupling member 14. This coupling sleeve has at its other end a pair of bayonet slots 22, the circumferentially extended parts 23 thereof being inclined or extended spirally a short distance around the sleeve. The coupling member 15 has a pair of coupling arms 16 of such size and shape that they are respectively adapted to go into the two bayonet slots 22 and to be turned around in the spirally disposed parts 23 of said slots.

For convenience in turning the sleeve 20 as it must be turned to couple the parts together, said sleeve is provided with a little operating wheel 23. A corresponding wheel 17 is secured to the conical member 15, the coupling lugs 16 referred to serving as the spokes of this wheel 17.

It will be understood that the coupling sleeve 20 and the coupling member 14 are permanently carried by the pipe 10; and the coupling member 15 is permanently carried by the pipe 12. When coupling these two pipes together one inserts the conical end of the coupling member 15 into the open end of the sleeve 20 and thence into the conical recess in the coupling member 14, taking care that the coupling lugs 15 enter the open ends of the bayonet slots 22. Then by taking hold of the two wheels 17 and 24 the operator turns the coupling sleeve 20, whereby the spiral slots 23 acting upon the coupling lugs 16 draw the cone 15 tightly into the conical recess 14ª. To uncouple the pipes one merely reverses these operations.

In using these couplings for the purpose for which they were primarily designed, they get pretty rough usage. It is obviously necessary to protect the conical surfaces which must tightly fit one another when the pipes are connected together. The surface of the conical recess 14ª is of course amply protected; but to protect the conical surface of the cone 15ª a cylindrical flange 19 is formed on the member 15 around the cone 15ª and projects beyond the same so that there is very little danger that the surface of the cone can be injured when the coupling is thrown upon a pile of similar couplings, for example.

Having described my invention, I claim:—

1. The combination of a pipe which carries in its ends a coupling member having in its end a conical recess, a coupling sleeve which loosely embraces said pipe and coupling member and has in its end bayonet slots whose circumferential portions extend spirally, with a second pipe carrying on its ends a coupling cone fitted into said conical recess and having outwardly projecting coupling lugs adapted to enter and slide in said bayonet slots.

2. The combination of a pipe which carries in its ends a coupling member having in its end a conical recess, a coupling sleeve which loosely embraces said pipe and coupling member and has in its end bayonet slots whose circumferential portions extend spirally, with a second pipe carrying on its ends a coupling cone fitted into said conical recess and having outwardly projecting coupling lugs adapted to enter and slide in said bayonet slots, said coupling sleeve being provided with an operating wheel.

3. The combination of a pipe which carries in its ends a coupling member having in its end a conical recess, a coupling sleeve which loosely embraces said pipe and coupling member and has in its end bayonet slots whose circumferential portions extend spirally, with a second pipe carrying on its ends a coupling cone fitted into said conical recess and having outwardly projecting coupling lugs adapted to enter and slide in said bayonet slots, and the last mentioned coupling member being provided with a cylindrical flange around the cone and connected with said coupling lugs.

In testimony whereof I hereunto affix my signature.

HAROLD A. DENMIRE.